(12) United States Patent
Zhang et al.

(10) Patent No.: US 10,412,365 B2
(45) Date of Patent: Sep. 10, 2019

(54) CALIBRATION ARRANGEMENT FOR STRUCTURED LIGHT SYSTEM USING A TELE-CENTRIC LENS

(71) Applicant: Purdue Research Foundation, West Lafayette, IN (US)

(72) Inventors: Song Zhang, West Lafayette, IN (US); Beiwen Li, Lafayette, IN (US)

(73) Assignee: PURDUE RESEARCH FOUNDATION, West Lafayette, IN (US)

(*) Notice: Subject to any disclaimer, the term of this patent is extended or adjusted under 35 U.S.C. 154(b) by 199 days.

(21) Appl. No.: 15/273,463

(22) Filed: Sep. 22, 2016

(65) Prior Publication Data

US 2017/0085860 A1 Mar. 23, 2017

Related U.S. Application Data

(60) Provisional application No. 62/221,699, filed on Sep. 22, 2015.

(51) Int. Cl.
| | |
|---|---|
| *H04N 13/204* | (2018.01) |
| *H04N 17/00* | (2006.01) |
| *G06T 7/80* | (2017.01) |
| *G06T 7/521* | (2017.01) |

(52) U.S. Cl.
CPC .......... *H04N 13/204* (2018.05); *G06T 7/521* (2017.01); *G06T 7/80* (2017.01); *H04N 17/002* (2013.01); *G06T 2207/30208* (2013.01)

(58) Field of Classification Search
CPC ...... H04N 13/204; H04N 17/002; G06T 7/80; G06T 7/521; G06T 2207/30208
USPC ............................................. 348/46
See application file for complete search history.

(56) References Cited

U.S. PATENT DOCUMENTS

| | | | |
|---|---|---|---|
| 6,289,107 B1* | 9/2001 | Borchers | A43D 1/02 356/391 |
| 8,520,067 B2* | 8/2013 | Ersue | G01B 11/002 348/139 |
| 9,704,232 B2* | 7/2017 | Karam | G06T 7/0004 |
| 10,029,622 B2* | 7/2018 | Brown | B60R 11/04 |
| 2011/0026014 A1 | 2/2011 | Mack et al. | |
| 2012/0148145 A1 | 6/2012 | Liu et al. | |
| 2016/0261851 A1 | 9/2016 | Tian et al. | |

\* cited by examiner

*Primary Examiner* — William C Vaughn, Jr.
*Assistant Examiner* — Jae N Noh
(74) *Attorney, Agent, or Firm* — Purdue Research Foundation

(57) ABSTRACT

A vision system having a telecentric lens. The vision system includes a projector having a non-telecentric pin-hole lens, a camera having a telecentric lens positioned a distance away from the projector, and a processor. The processor controls the camera and the projector and is configured to calibrate the camera and projector.

12 Claims, 7 Drawing Sheets

CALIBRATION ARRANGEMENT FOR STRUCTURED LIGHT SYSTEM USING A TELE-CENTRIC LENS

CROSS-REFERENCE TO RELATED APPLICATIONS

The present U.S. patent application is related to and claims the priority benefit of U.S. Provisional Patent Application Ser. No. 62/221,699, filed Sep. 22, 2015, the contents of which are hereby incorporated by reference in their entirety into the present disclosure.

This invention was made with government support under CMMI-1531048 awarded by the National Science Foundation. The government has certain rights in the invention.

TECHNICAL FIELD

The present disclosure related to 3D digital imaging and optical 3D reconstruction, and more particularly, it refers to a calibration arrangement for a structured light system using a telecentric lens.

BACKGROUND

This section introduces aspects that may help facilitate a better understanding of the disclosure. Accordingly, these statements are to be read in this light and are not to be understood as admissions about what is or is not prior art.

With recent advances in precision manufacturing, there has been an increasing demand for the development of efficient and accurate micro-level 3D metrology approaches. A structured light (SL) system with digital fringe projection technology is regarded as a potential solution to micro-scale 3D profilometry based on its capability of high-speed, high-resolution measurement. To migrate this 3D imaging technology into micro-scale level, a variety of approaches were carried out, either by modifying one channel of a stereo microscope with different projection technologies, or using small field-of-view (FOV), non-telecentric lenses with long working distance (LWD).

Apart from the technologies mentioned above, an alternative approach for microscopic 3D imaging is to use telecentric lenses because of their unique properties of orthographic projection, low distortion and invariant magnification over a specific distance range. However, the calibration of such optical systems is not straightforward especially for Z direction, since the telecentricity will result in insensitivity of depth changing along optical axis. Tian et al. in U.S. Pub. App. 20160261851 (incorporated herein by reference in its entirety into the present specification) described a system that uses a translation stage for Z-axis calibration. The orthographic projection model in Tian et al. is uses an intrinsic matrix (a transformation matrix from camera lens coordinate system to camera image (CCD) coordinates system) and extrinsic matrix (a transformation matrix from world coordinate system to camera lens coordinate system). Within this method, dimensions along X and Y are calibrated through the relationship between pixel coordinate and physical coordinate of feature points on a calibration target (e.g. center points of a circle array); Z value is determined by the linear relationship between phase and depth value (in the form of positional information of a translation stage). This method requires a high precision translation stage that is expensive. This technology has shown the possibility to calibrate a telecentric SL system analogously to a regular pin-hole SL system.

There is, therefore an unmet need for a novel approach to a calibration method using a calibration target in a telecentric three dimensional imaging system without a translation stage which does not require positional knowledge of the calibration target.

SUMMARY

A vision system having a telecentric lens is disclosed. The vision system includes a projector having a non-telecentric pin-hole lens, a camera having a telecentric lens positioned a distance away from the projector, and a processor. The processor controls the camera and the projector and is configured to calibrate the camera and projector according to i) control the camera to capture one or more images from a calibration target including one or more feature points with known world X-Y coordinates placed on a surface (Cal-Image), ii) identify feature points in the Cal-Image generating one or more set of coordinates, iii) control the projector to project at least one set of orthogonal fringe pattern onto the calibration target while commanding the camera to capture one image of the fringe pattern crossing the calibration target (Fringe-Image), iv) analyze the Fringe-Image to calculate the absolute phase of the at least one projected orthogonal fringe pattern, v) analyzing the absolute phase to establish a translation relationship between the X-Y coordinates of the camera to the X-Y coordinates of the projector, vi) calibrate the projector by calculating intrinsic and extrinsic matrices and calculate position of the calibration target in world XYZ coordinates, and vii) establish a calibration a matrix for the camera to thereby calibrate the camera.

A method to calibrate a camera having a telecentric lens and a projector in a vision system is also disclosed. The method includes placing a calibration target on a surface, controlling the camera to capture one or more images from a calibration target including one or more feature points with known world X-Y coordinates placed on a surface (Cal-Image), identifying feature points in the Cal-Image generating one or more set of coordinates, controlling the projector to project at least one set of orthogonal fringe pattern onto the calibration target while commanding the camera to capture one image of the fringe pattern crossing the calibration target (Fringe-Image), analyzing the Fringe-Image to calculate the absolute phase of the at least one projected orthogonal fringe pattern, analyzing the absolute phase to establish a translation relationship between the X-Y coordinates of the camera to the X-Y coordinates of the projector, calibrating the projector by calculating intrinsic and extrinsic matrices and calculate position of the calibration target in world XYZ coordinates, and establishing a calibration a matrix for the camera to thereby calibrate the camera.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figure 1:
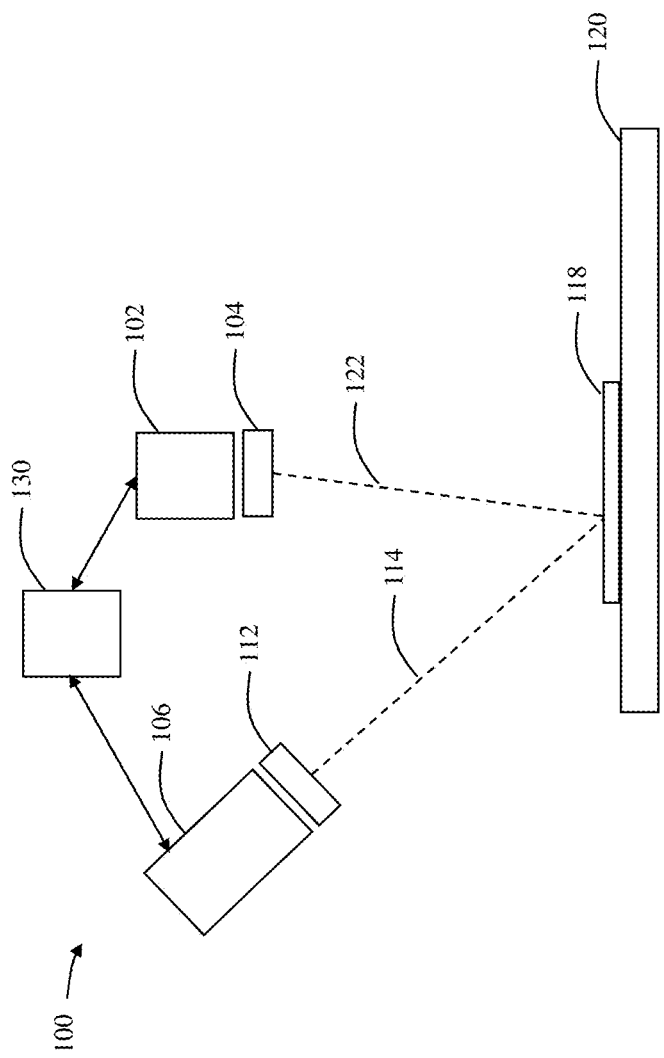
FIG. 1 depicts a 3-dimensional vision system for analyzing an object, according to the present disclosure.

The attached drawings are for purposes of illustration and are not necessarily to scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

A novel approach is provided for a calibration method using a calibration target in a telecentric three dimensional imaging system without a translation stage that does not require positional knowledge of the calibration target. In the present disclosure the terms "about" can allow for a degree of variability in a value or range, for example, within 10%, within 5%, or within 1% of a stated value or of a stated limit of a range.

Referring to FIG. 1, a system 100 that includes a camera 102 with telecentric lens 104 and a projector 106 with small field of view (FOV) is depicted. The projector 106 having long working distance (LWD) pin-hole lens 112 is used to assist the calibration of the camera 102 with the telecentric lens 104 by projecting a sequence of fringe patterns 114 onto an calibration target 118 positioned on a surface 120 without known positional information. A reflection 122 of the fringe patterns 114 are transmitted through the telecentric lens 104 of the camera 102 and are captured by a charge coupled device (CCD) (not shown) of the camera 102. Also included in the system 100 is a processor 130 configured to control the projector 106 by commanding the projector 106 to project patterns on to the calibration target 118 at various positions. The processor 130 is also configured to control the camera 102 by commanding the camera 102 to capture images and receive and analyze data associated with those images.

Figure 2:
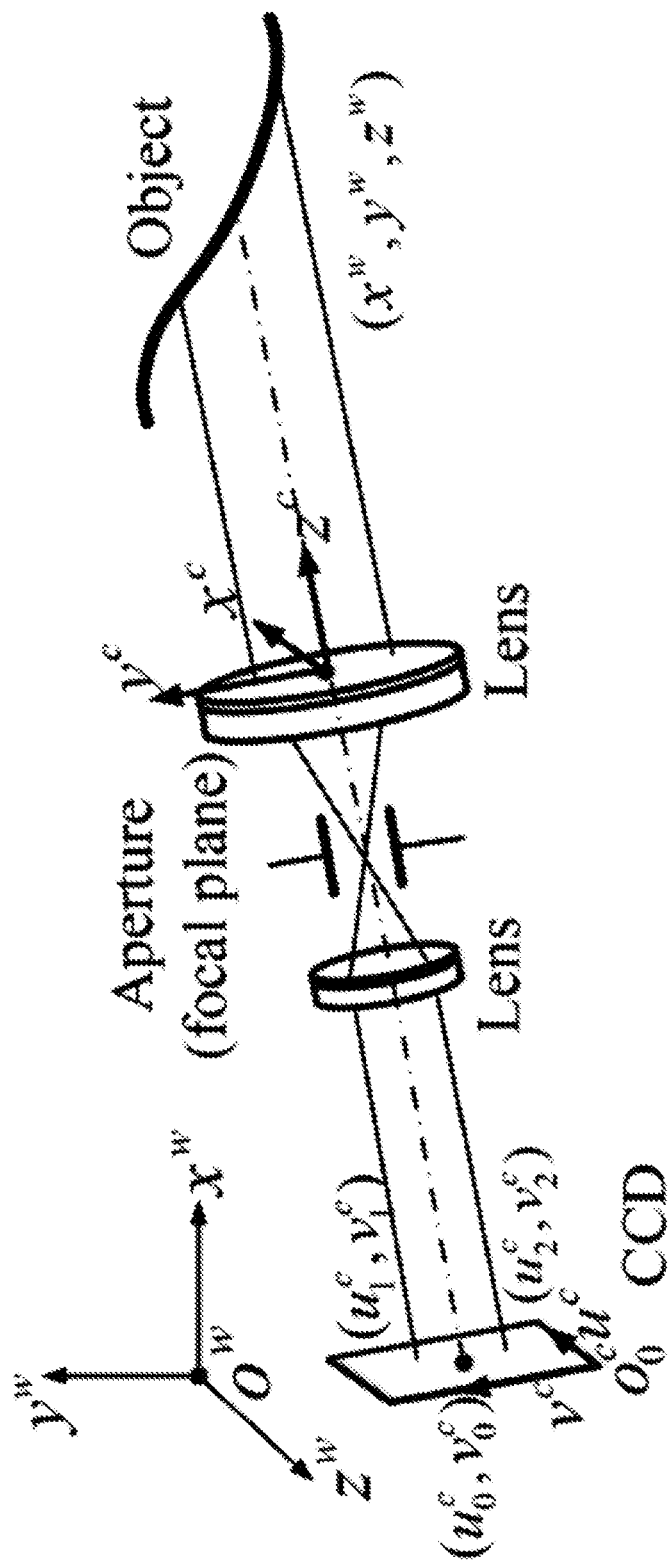
FIG. 2 depicts a model for a camera with a telecentric lens.

The principals of calibration for the system 100 is described as follows. The camera model with a telecentric lens is demonstrated in FIG. 2. The telecentric lens performs a magnification in both X and Y direction, while it is not sensitive to the depth in Z direction. By carrying out ray transfer matrix analysis for such an optical system, the relationship between the camera coordinate ($o^c$; $x^c$, $y^c$, $z^c$) and the image coordinate ($o_0^c$; $u^c$, $v^c$) can be described as follows:

$$\begin{bmatrix} u^c \\ v^c \\ 1 \end{bmatrix} = \begin{bmatrix} s_x^c & 0 & 0 & 0 \\ 0 & s_y^c & 0 & 0 \\ 0 & 0 & 0 & 1 \end{bmatrix} \begin{bmatrix} x^c \\ y^c \\ z^c \\ 1 \end{bmatrix}, \quad (1)$$

where $s_x^c$ and $s_y^c$ are respectively the magnification ratio in X and Y direction. The transformation from the world coordinate ($o^w$; $x^w$, $y^w$, $z^w$) to the camera coordinate can be formulated as follows:

$$\begin{bmatrix} x^c \\ y^c \\ z^c \\ 1 \end{bmatrix} = \begin{bmatrix} r_{11}^c & r_{12}^c & r_{13}^c & r_1^c \\ r_{21}^c & r_{22}^c & r_{23}^c & r_2^c \\ r_{31}^c & r_{32}^c & r_{33}^c & r_3^c \\ 0 & 0 & 0 & 1 \end{bmatrix} \begin{bmatrix} x^w \\ y^w \\ z^w \\ 1 \end{bmatrix}, \quad (2)$$

where $r_{ij}^c$ and $t_i^c$ respectively denote the rotation and translation parameters. Combining Eq. (1)-(2), the projection from 3D object points to 2D camera image points can be formulated as:

$$\begin{bmatrix} u^c \\ v^c \\ 1 \end{bmatrix} = \begin{bmatrix} m_{11}^c & m_{12}^c & m_{13}^c & m_{14}^c \\ m_{21}^c & m_{22}^c & m_{23}^c & m_{24}^c \\ 0 & 0 & 0 & 0 \end{bmatrix} \begin{bmatrix} x^w \\ y^w \\ z^w \\ 1 \end{bmatrix} \quad (3)$$

since $u^c$, $u^v$, $x^w$, $y^w$, and $z^w$ are all known, $m_{ij}^c$ coefficients are determined by applying, e.g., a least square method.

Figure 3:
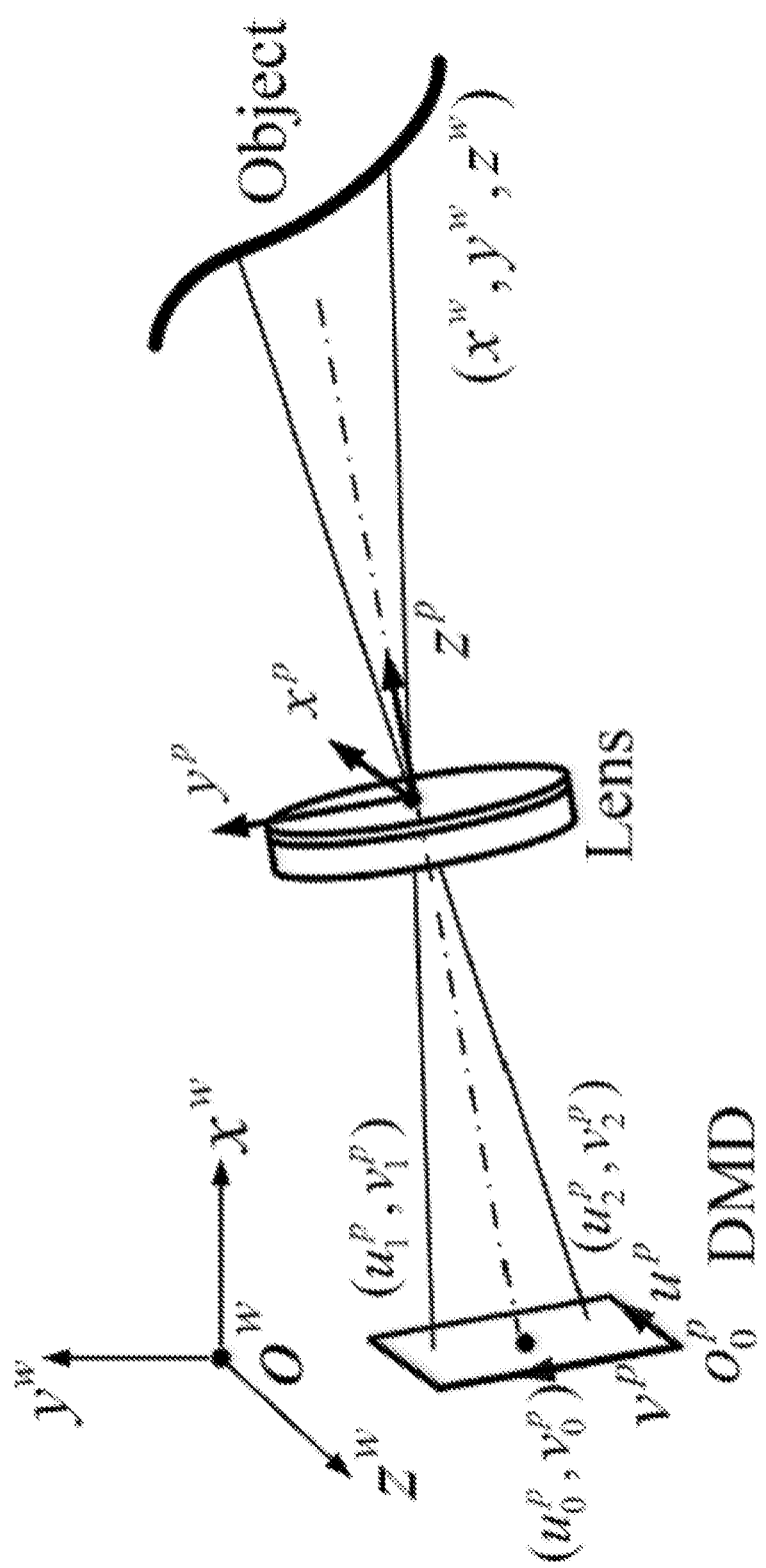
FIG. 3 depicts a model for a projector with a pin-hole lens.

The projector model uses a pin-hole imaging model, known to a person having ordinary skill in the art, and which is illustrated in FIG. 3. The projection from 3D object points ($o^w$; $x^w$, $y^w$, $z^w$) to 2D projector sensor points ($o_0^c$; $u^p$, $v^p$) can be described as follows:

$$s^p \begin{bmatrix} u^p \\ v^p \\ 1 \end{bmatrix} = \begin{bmatrix} \alpha & \gamma & u_a^p \\ 0 & \beta & v_0^p \\ 0 & 0 & 1 \end{bmatrix} [R_{3\times3}^p \ t_{3\times1}^p] \begin{bmatrix} x^w \\ y^w \\ z^w \\ 1 \end{bmatrix} \quad (4)$$

where $s^p$ represents the scaling factor; $\alpha$ and $\beta$ are respectively the effective focal lengths of the camera u and v direction. The $$\begin{bmatrix} \alpha & \gamma & u_a^p \\ 0 & \beta & v_0^p \\ 0 & 0 & 1 \end{bmatrix}$$

matrix is the intrinsic matrix (a transformation matrix from projector lens coordinate system to projector DMD (digital micro-mirror device) coordinates system) and the [$R_{3\times3}^p$ $t_{3\times1}^p$] matrix is the extrinsic matrix (a transformation matrix from world coordinate system to projector lens coordinate system). Multiple methods may be used to determine the intrinsic camera parameters, including the focal length, optical image center location on the camera CCD. This calculation can be performed by any number of standard imaging libraries. For example, this calculation can be solved by the cvCalibrateCamera2 function in the OpenCV library from Intel Corporation of Santa Clara, Calif., U.S., as provided by, e.g., U.S. Pub. App. No. 20110026014, incorporated herein by reference in its entirety into the present specification. The cvCalibrateCamera2 function takes as inputs the set of X-Y-Z coordinates and their associated X-Y coordinates on the image sensor 120, and generates the following intrinsic lens parameters: Focal Length (in pixels), Vertical Image Origin (in pixels), and Horizontal Image Origin (in pixels). In one embodiment, the dimensions of the focal length and the vertical and horizontal image origins are converted to physical dimensions to be used in modeling the projector 106. In order to convert pixels to millimeters, the physical size of the projector DMD is calculated, as well as the number of pixels on that size. These values are commonly published in the specifications of the projector. To convert the focal length in pixels to a focal length in millimeters, the following calculation is used: Focal Length (mm)=Focal Length(pixels)*Sensor size (mm)/Sensor Pixels.

Figures 5A, 5B, 5C, 5D:
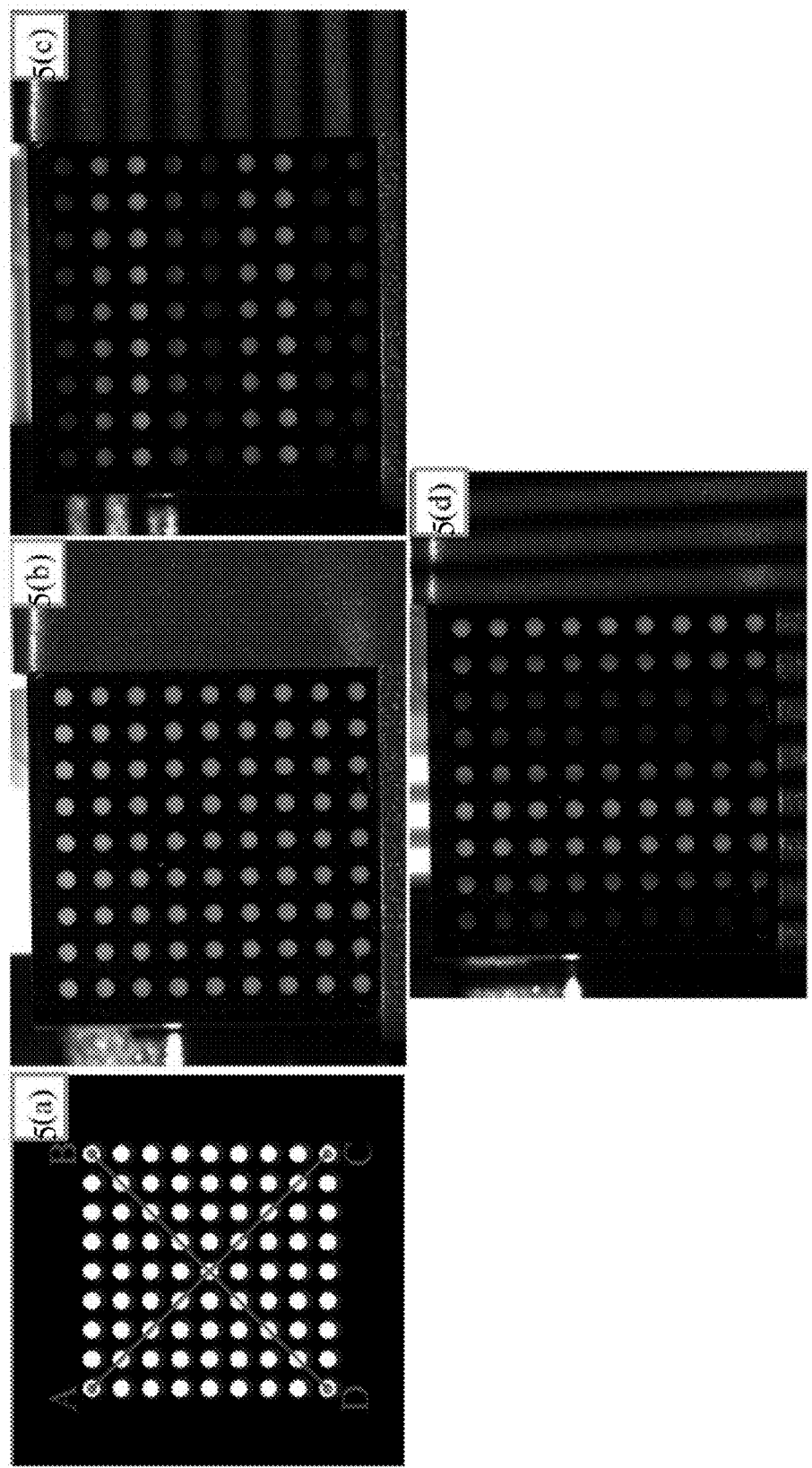
FIGS. 5(a)-5(d) depict calibration target (a), camera image of the calibration target (b), captured image with horizontal fringe pattern (c), and captured image with vertical fringe pattern (d).

For each orientation of the planar calibration target 118 captured by the camera 102 and mapped to the projector 106, the position of the calibration target 118 can be calculated through the cvFindExtrinsicCameraParams2 function in the Intel OpenCV software library. This function takes as inputs the X-Y-Z coordinates of the feature points (e.g., circle centers (see FIG. 5(a))) on the planar calibration target 118 and the locations associated with the image of the centers of the feature points for each separate image 150, as well as the previously calculated intrinsic lens parameters. This function can subsequently generate the position in world X-Y-Z coordinates.

Figure 4:
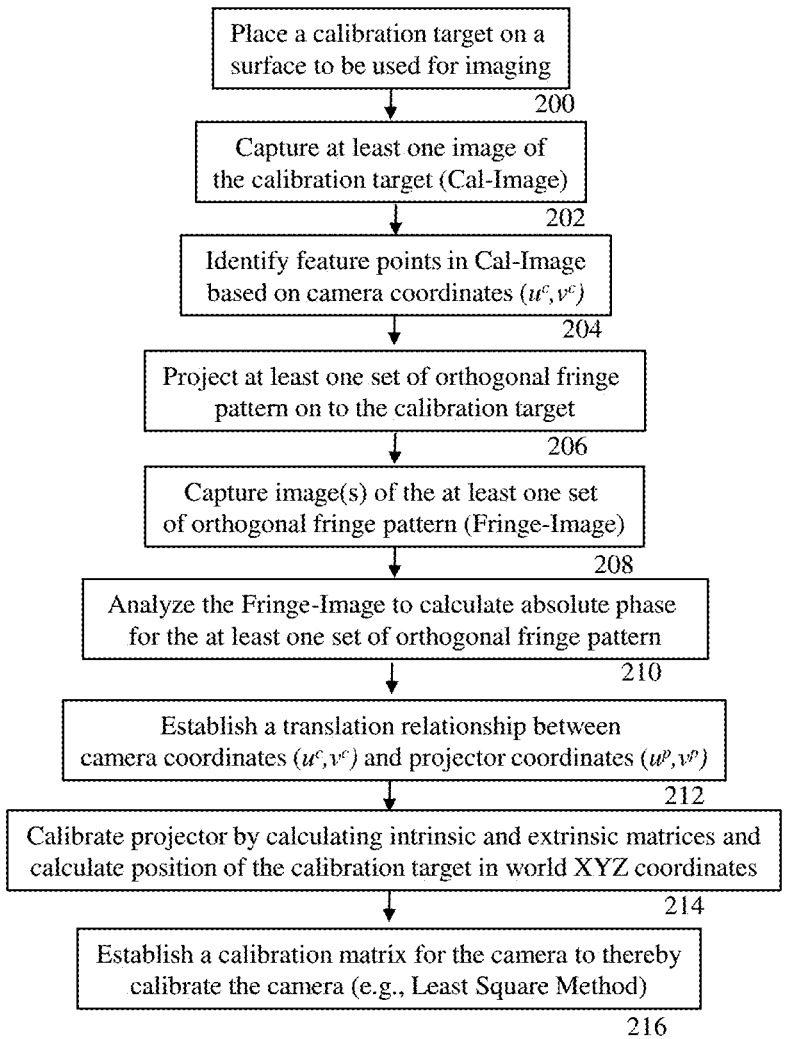
FIG. 4 depicts a flow chart describing the steps involved in calibrating a vision system with a camera having a telecentric lens and a projector having a pin-hole lens.

In order to calibrate the camera 102 and its telecentric lens 104, the following procedure is carried out in accordance to FIG. 4. As an initial step 200, a calibration target is placed on the surface 120. Next, the processor 130 in step 202 commands the camera 102 to capture at least one image (hereafter referred to a Cal-Image), shown as FIG. 5(b) of the calibration target. The calibration target includes feature points. An example of the calibration target is a 9×9 circle board provided in FIG. 5(a) where the feature points are circle centers. Next, the processor 103 in step 204 analyzes the Cal-Image and identifies the feature points and extract the circle centers coordinates ($u^c$, $v^c$) as coordinates for each of the feature points. Next, the processor 130 commands the projector 106 to project a sequence of fringe patterns (e.g., at least one set of orthogonal sinusoidal pattern) on to the calibration target so as to cross the calibration target 118. Once the fringe patterns has appropriately crossed the calibration target 118, a captured image associated with the fringe pattern is hereunder referred to as the Fringe-Image, as provide in step 208. Next, the processor 130 analyzes the Fringe-Image to calculate absolute phase for the at least one set of orthogonal fringe pattern, and thereby establishes a translation relationship between camera X-Y coordinates and projector X-Y coordinates, as provided in steps 210-212. The next step is to calibrate the pinhole lens 112 of the projector 106. Next in step 214, the processor 130 uses OPENCV camera calibration toolboxes, known to a person having ordinary skill in the art, to determine both the intrinsic and extrinsic matrices of the projector 106, as discussed above. The extrinsic matrices (rotation and translation) essentially transform the pre-defined X-Y-Z target coordinate (Z=0) of feature points to world X-Y-Z coordinate. Once the world X-Y-Z coordinate is determined, the processor 103 establishes a calibration matrix for the camera 102 to be used to calibrate it, step 216.

The processor 130 determines the absolute phase information of the fringe pattern by using a least-square phase-shifting algorithm with 9 steps (N=9). The k-th projected fringe image can be expressed as follows:

$$I_k(x,y)=I'(x,y)+I''(x,y)\cos(\phi+2k\pi/N) \quad (5)$$

where I'(x, y) represents the average intensity, I''(x, y) the intensity modulation, and $\phi$(x, y) the phase—the processor 130 solves the phase according to:

$$\phi(x, y) = \tan^{-1}\left[\frac{\sum_{k=1}^{N} I_k \sin(2k\pi/N)}{\sum_{k=1}^{N} I_k \cos(2k\pi/N)}\right] \quad (6)$$

This equation produces wrapped phase map ranging [−π, +π]. Using a multi-frequency phase shifting technique, allowing the processor 130 to extract the absolute phase maps $\Phi_{ha}$ and $\Phi_{va}$ without 2π discontinuities respectively from captured images with horizontal (see FIG. 5(c)) and vertical pattern projection (see FIG. 5(d)).

In establishing the translation relationship between the camera 102 and the projector 106, the processor 130 determines the circle center with respect to the X-Y coordinates of the projector 106 by using the absolute phases obtained from above, the projector's circle center ($u^p$, $v^p$) can be uniquely determined from the camera circle centers obtained (see above) according to the following equations:

$$u^p=\phi_{ha}^c(u^c,v^c)\times P_1/2\pi. \quad (7)$$

$$v^p=\phi_{va}^c(u^c,v^c)\times P_2/2\pi \quad (8)$$

where $P_1$ and $P_2$ are respectively the fringe periods of the horizontal (ha: horizontal absolute phase) and vertical (va: vertical absolute phase) patterns used above for absolute phase determination. This step converts the absolute phase values into projector pixels.

The processor 130 uses the above-obtained information to determine the projector intrinsic parameters (i.e. $\alpha$, $\beta$, $\gamma$, $u_0^c$, $v_0^c$) (step 210) using standard camera calibration toolbox software.

The processor 130 aligns the world coordinates ($o^w$; $x^w$, $y^w$, $z^w$) with the projector coordinates ($o^p$; $x^p$, $y^p$, $z^p$) (step 212). The transformation matrix [$R_{3\times3}^p t_{3\times1}^p$] from the world coordinates ($o^w$; $x^w$, $y^w$, $z^w$) to the projector coordinates ($o^p$; $x^p$, $y^p$, $z^p$) becomes [$I_{3\times3}$, $0_{3\times1}$], which is composed of a 3×3 identity matrix $I_{3\times3}$ and a 3×1 zeros vector $0_{3\times1}$. To obtain the 3D world coordinates of target points, first calculate the target coordinate ($o^t$; $x^t$, $y^t$, 0) by assuming its Z coordinate to be zero, and assign the upper left circle center (point A in FIG. 5(a)) to be the origin. For each target pose, the processor 130 calculates the transformation matrix [$R_t$, $t_t$] from target coordinate to world coordinate using iterative Levenberg-Marquardt optimization method. This optimization approach iteratively minimizes the difference between the observed projections and the projected object points, which can be formulated as the following functional:

$$\min_{R_t,t_t}\left\|\begin{bmatrix}u^p\\v^p\\1\end{bmatrix} - M_p[R_t, t_t]\begin{bmatrix}x^t\\y^t\\0\\1\end{bmatrix}\right\|, \quad (9)$$

where $\|\cdot\|$ denotes the least square difference. Mp denotes the projection from the world coordinate to image coordinate. After this step, the 3D coordinates of the target points (i.e. circle centers) can be obtained by applying this transformation to the points in target coordinate.

In determining the camera calibration matrix, the processor 130 then solves camera parameters $m_{ij}^c$ in the least-square sense using Eq. (3). After calibrating both the camera and the i projector, using Eq. (3) and Eq. (4), the 3D coordinate ($x^w$, $y^w$, $z^w$) of a real-world object can be computed.

Figures 6A, 6B:
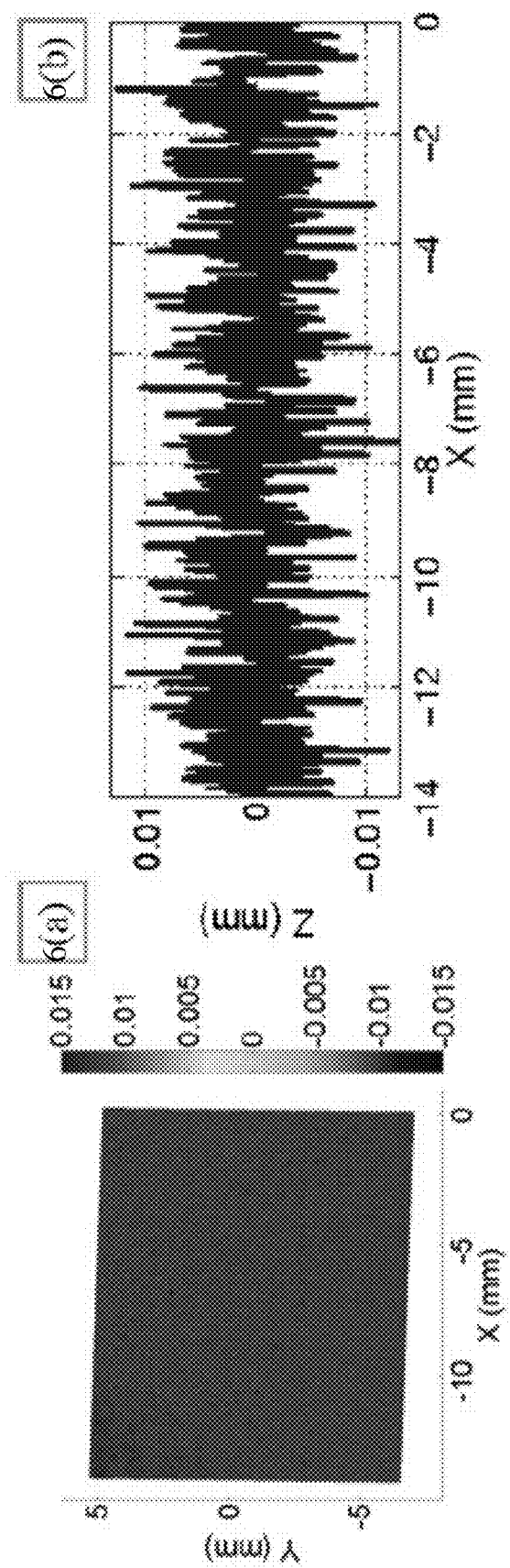
FIG. 6(a) depicts experimental results of measuring a flat plane.
FIG. 6(b) depicts a cross section of (a).
Figures 7A, 7B, 7C, 7D, 7E, 7F:
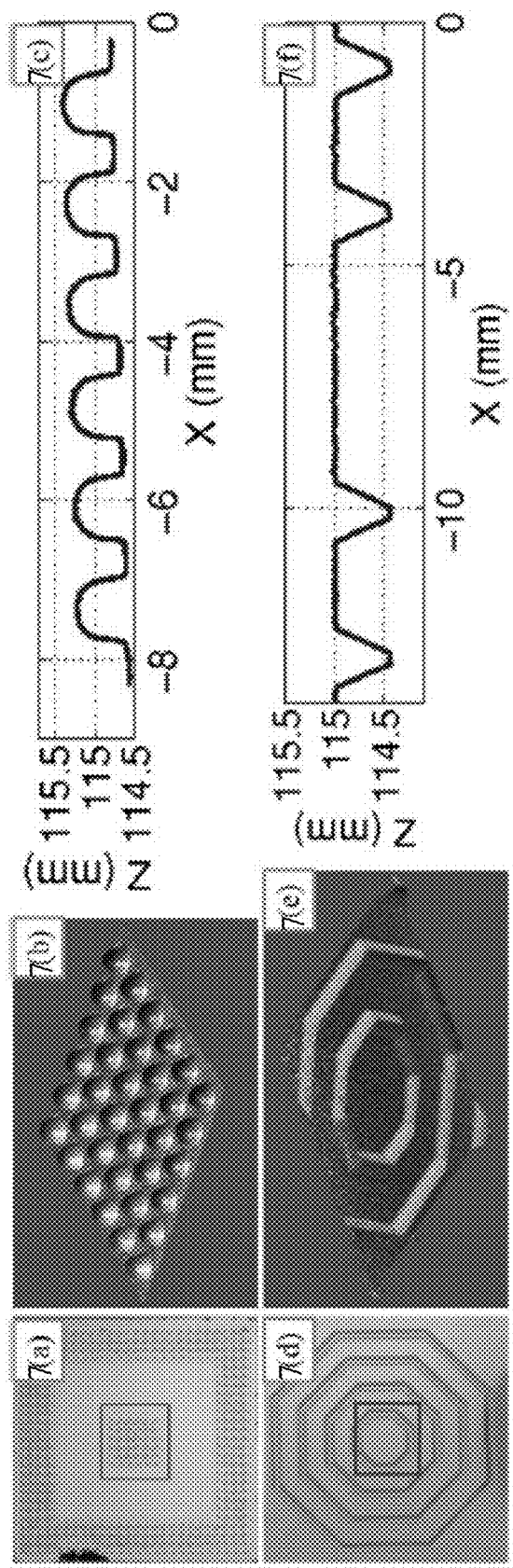
FIG. 7(a)-7(f) depict experimental results of measuring complex surface geometries: ball grid array (a) and (b); a flat surface with octagon grooves (d) and (e); and cross sections of (b) and (e) shown in (c) and (f), respectively.

To show the efficacy of the calibration methodology discussed here, the 3D geometry of a flat plane was measured and was compare with an ideal plane obtained through least-square fitting. FIG. 6(*a*) shows the 2D error map, and FIG. 6(*b*) shows one of its cross section. The root-mean-square (RMS) error for the measured plane is 4.5 μm, which is small comparing with the random noise level (approximately 20 μm). The major sources of error could come from the roughness of this measured surface, or/and the random noise of the camera. This result indicates that our calibration method can provide a good accuracy for 3D geometry reconstruction Further, to visually demonstrate the calibration method of the present disclosure, two different types of objects with complex geometries were measured. First a ball grid array (FIG. 7(*a*) magnified in FIG. 7(*b*)) was measured and then a flat surface with octagon grooves (FIG. 7(*d*) magnified in FIG. 7(*e*)) was next measured. The reconstructed 3D geometries and the corresponding cross sections are shown in FIGS. 7(*c*) and 7(*f*).

Those skilled in the art will recognize that numerous modifications can be made to the specific implementations described above. The implementations should not be limited to the particular limitations described. Other implementations may be possible.

The invention claimed is:

1. A vision system having a telecentric lens, comprising:
   a projector having a non-telecentric pin-hole lens;
   a camera having a telecentric lens positioned a distance away from the projector; and
   a processor controlling the camera and the projector and configured to calibrate the camera and projector according to:
   i) control the camera to capture one or more images from a calibration target including one or more feature points with known world X-Y coordinates placed on a surface (Cal-Image),
   ii) identify feature points in the Cal-Image generating one or more set of coordinates,
   iii) control the projector to project at least one set of orthogonal fringe pattern onto the calibration target while commanding the camera to capture one image of the fringe pattern crossing the calibration target (Fringe-Image),
   iv) analyze the Fringe-Image to calculate the absolute phase of the at least one projected orthogonal fringe pattern,
   v) analyzing the absolute phase to establish a translation relationship between the X-Y coordinates of the camera to the X-Y coordinates of the projector, vi) calibrate the projector by calculating intrinsic and extrinsic matrices and calculate position of the calibration target in world XYZ coordinates, and vii) establish a calibration matrix for the camera to thereby calibrate the camera.

2. The vision system of claim 1, the calibration target is a 9×9 circle board.

3. The vision system of claim 2, the feature points are circle centers.

4. The vision system of claim 1, the at least one set of orthogonal fringe pattern includes orthogonal sinusoidal pattern.

5. The vision system of claim 1, the transformation relationship between the X-Y-Z target coordinate to world X-Y-Z coordinate is analyzed by an iterative Levenberg-Marquardt optimization method.

6. The vision system of claim 1, the calibration matrix for the camera is computed by a least square method.

7. A method to calibrate a camera having a telecentric lens and a projector in a vision system, comprising:
   placing a calibration target on a surface;
   controlling the camera having the telecentric lens to capture one or more images from a calibration target including one or more feature points with known world X-Y coordinates placed on a surface (Cal-Image);
   identifying feature points in the Cal-Image generating one or more set of coordinates, controlling the projector, wherein the projector comprises a non-telecentric lens, to project at least one set of orthogonal fringe pattern onto the calibration target while commanding the camera to capture one image of the fringe pattern crossing the calibration target (Fringe-Image);
   analyzing the Fringe-Image to calculate the absolute phase of the at least one projected orthogonal fringe pattern;
   analyzing the absolute phase to establish a translation relationship between the X-Y coordinates of the camera to the X-Y coordinates of the projector;
   calibrating the projector by calculating intrinsic and extrinsic matrices and calculate position of the calibration target in world XYZ coordinates, and establishing a calibration matrix for the camera to thereby calibrate the camera.

8. The method of claim 7, the calibration target is a 9×9 circle board.

9. The method of claim 8, the feature points are circle centers.

10. The method of claim 7, the at least one set of orthogonal fringe pattern includes orthogonal sinusoidal pattern.

11. The method of claim 7, the transformation relationship between the X-Y-Z target coordinate to world X-Y-Z coordinate is analyzed by an iterative Levenberg-Marquardt optimization method.

12. The method claim 7, the calibration matrix for the camera is computed by a least square method.

* * * * *